United States Patent
Nazari et al.

(10) Patent No.: US 7,381,148 B2
(45) Date of Patent: Jun. 3, 2008

(54) SYSTEM FOR ENSURING THE ABILITY TO START AN INTERNAL COMBUSTION ENGINE CONTAINED WITHIN A DRIVE TRAIN

(75) Inventors: Behzad Nazari, Nuertingen (DE); Jens Martin, Sinzheim-Kartung (DE); Matthias Ehrlich, Buehl (DE); Joachim Hirt, Oberkirch (DE); Frank Stengel, Buehl-Neusatz (DE); Martin Fuss, Wooster, OH (US); Alexander Schweizer, Buehl (DE); Martin Zimmermann, Sasbach (DE)

(73) Assignee: LuK Lamellen und Kupplungsbau Betelligungs KG, Buehl (DE)

( * ) Notice: Subject to any disclaimer, the term of this patent is extended or adjusted under 35 U.S.C. 154(b) by 241 days.

(21) Appl. No.: 11/285,344

(22) Filed: Nov. 22, 2005

(65) Prior Publication Data
US 2006/0154782 A1 Jul. 13, 2006

(30) Foreign Application Priority Data
Nov. 25, 2004 (DE) ...................... 10 2004 056 850

(51) Int. Cl.
*B60W 10/02* (2006.01)
*B60W 10/06* (2006.01)
(52) U.S. Cl. ........................................ 477/99; 477/167
(58) Field of Classification Search .................. 477/167
See application file for complete search history.

(56) References Cited

U.S. PATENT DOCUMENTS

| | | | | |
|---|---|---|---|---|
| 2,328,303 A | * | 8/1943 | Simpson ...................... 477/167 |
| 3,419,115 A | * | 12/1968 | Glenn ........................ 477/167 |
| 4,617,855 A | * | 10/1986 | Wrobleski et al. ............ 92/5 R |
| 4,705,151 A | * | 11/1987 | Leigh-Monstevens et al. ... 192/111.12 |
| 5,064,039 A | | 11/1991 | Otsuka et al. ........... 192/0.052 |
| 5,964,680 A | | 10/1999 | Salecker et al. .............. 477/74 |
| 5,966,984 A | * | 10/1999 | Moore et al. ..................... 74/6 |
| 6,218,743 B1 | * | 4/2001 | Hayashi et al. ............ 307/10.6 |
| 2003/0064859 A1 | * | 4/2003 | St. Pierre et al. ........... 477/167 |

FOREIGN PATENT DOCUMENTS

| | | |
|---|---|---|
| DE | 19815260 | 10/1998 |
| DE | 10234083 | 2/2004 |
| EP | 0441290 | 8/1991 |
| JP | 61077531 | 4/1986 |
| JP | 62122825 | 6/1987 |

* cited by examiner

*Primary Examiner*—Sherry Estremsky
(74) *Attorney, Agent, or Firm*—Simpson & Simpson, PLLC

(57) ABSTRACT

A system for ensuring the ability to start an internal combustion engine contained within a drive train of a vehicle includes, in addition to an actuation device, a torque transmission device contained in the drive train between the internal combustion engine and driven vehicle wheels, an enabling device that is operable by a person operating the vehicle and by means of which the operability of the starter is enabled for starting the internal combustion engine when the torque transmission between the internal combustion engine and the driven wheels of the vehicle is interrupted.

2 Claims, 1 Drawing Sheet

SYSTEM FOR ENSURING THE ABILITY TO START AN INTERNAL COMBUSTION ENGINE CONTAINED WITHIN A DRIVE TRAIN

CROSS REFERENCE TO RELATED APPLICATIONS

This patent application claims priority of German Patent Application No. 10 2004 056 850.2, filed Nov. 25, 2004, which application is incorporated herein by reference.

FIELD OF THE INVENTION

The invention relates to a system for ensuring the ability to start an internal combustion engine contained within a drive train.

BACKGROUND OF THE INVENTION

In vehicles equipped with an automatic clutch or a clutch controlled by an actuator device, the internal combustion engine for safety reasons may only be started if predetermined conditions are fulfilled. For example, the transmission must be in a neutral gear and/or the clutch must be disengaged. In addition, it may be required that the vehicle brake be actuated. In automatic transmissions, the enabling of the starter is typically linked to the selection lever being in the position N or P. The aforementioned measures ensure that the vehicle is not unintentionally set in motion when the internal combustion engine is started.

In order to enable the vehicle to be towed or pushed in any case when there is an error or a failure in the electronic controller of the actuation system for an automatic clutch, so-called emergency disengagement devices that may be activated by a person operating the vehicle are known in order to disengage the clutch and thereby also be able then to push or tow the vehicle if a gear is engaged in the transmission.

A problem of vehicles having an automatic or automated drive train may result from the fact that when there is an error in the clutch/transmission control or actuation device, the condition for enabling of the starter is no longer satisfied, so that the internal combustion engine cannot be started in order, for example, to be able to operate the heater or the air conditioner or also the alternator in case the vehicle breaks down.

BRIEF SUMMARY OF THE INVENTION

The object of the present invention is to provide a remedy for this problem. This objective is achieved using a system for ensuring the ability to start an internal combustion engine contained within a drive train of a vehicle, this system including, in addition to an actuation device for a torque transmission device contained in the drive train between the internal combustion engine and driven vehicle wheels, an enabling device that is operable by a person operating the vehicle and by means of which the operability of the starter is enabled for starting the internal combustion engine when the torque transmission from the internal combustion engine to the driven wheels of the vehicle is interrupted.

The enabling device of the invention enables the security strategy, which permits an operation of the starter only under roughly simultaneous fulfillment of a plurality of conditions, to be overridden so that the internal combustion engine can be started if only the torque transmission from the internal combustion engine to the driven wheels is interrupted.

Advantageously, the enabling device contains an emergency disengagement device, which is operable by a person operating the vehicle, to interrupt the torque transmission from the internal combustion engine to the driven wheels, the operability of the starter being enabled when the torque transmission is interrupted by the emergency disengagement device.

In a preferred embodiment, the emergency disengagement device is designed in such a manner that it disengages the clutch.

The invention may be used to a great extent for all types of automated drive trains, such as those that contain a clutch controlled by an actuator and an automated-shift transmission, drive trains that contain an automatically shifting parallel-shift transmission having two alternately engaged clutches, drive trains having automatically shifting planetary transmissions, etc.

BRIEF DESCRIPTION OF THE DRAWINGS

The invention is explained below using examples in reference to diagrammatic drawings and with additional details. In the figures.

DETAILED DESCRIPTION OF THE INVENTION

Figure 1:
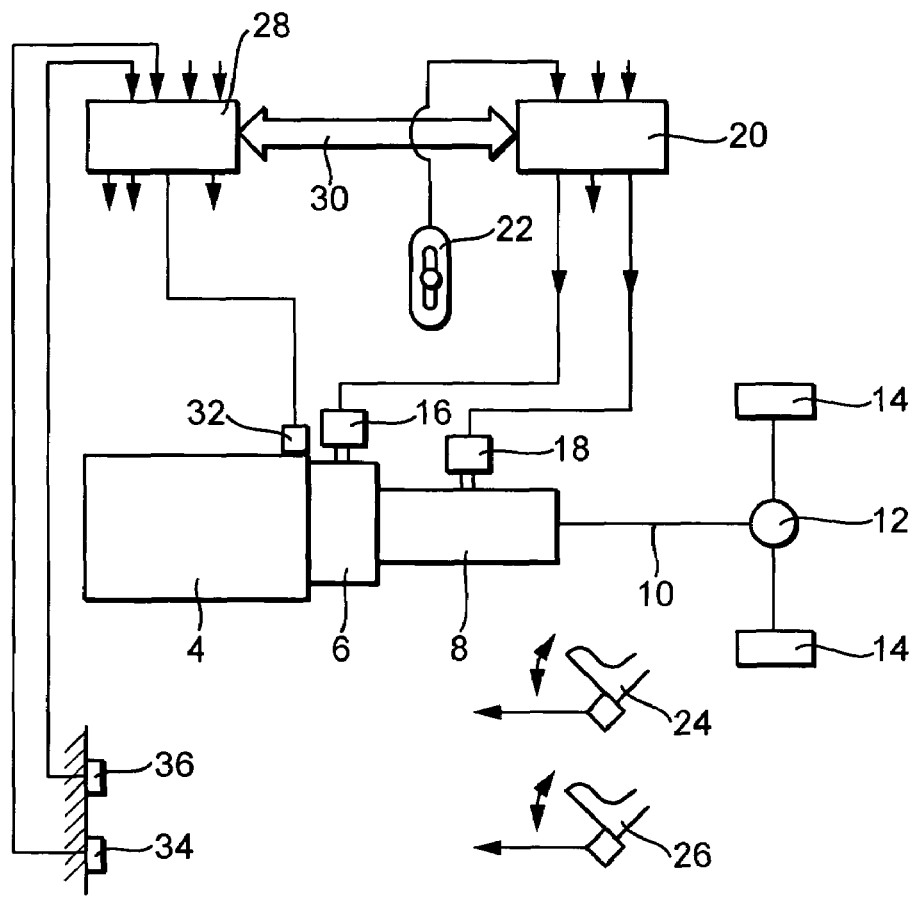
FIG. 1 shows a block diagram of a motor vehicle drive train.

According to FIG. 1, a vehicle drive train contains an internal combustion engine 4, which is connected via clutch 6 to a transmission 8, which is connected via an output shaft 10 and a differential 12 to driven wheels 14 of a motor vehicle.

Clutch 6 may, for example, be a friction clutch that is operable via an actuator device 16.

Transmission 8 may be an automated-shift transmission that is operable via an actuator device 18.

To control the operation of the actuator devices 16 and 18, a transmission controller 20 is provided that contains a microprocessor having accompanying memory storage devices in which different programs are stored that may be controlled via a selection lever 22. Inputs of transmission controller 20 are connected to sensors (not depicted) such as speed sensors for detecting the speed of the crankshaft of the internal combustion engine, the speed of output shaft 10, a sensor for detecting the position of a loaded control element of internal combustion machine 4, and/or sensors for detecting the position of an accelerator pedal 24 and a sensor for detecting the position of a brake pedal 26.

To control the power output of internal combustion engine 4, an engine controller 28 is provided that communicates with transmission controller 20 via a BUS 30 and with a loaded control element of the internal combustion engine as well as a starter 32. Inputs of engine controller 28 are connected to sensors for detecting the parameters controlling the operation of the internal combustion engine and a manually operated switch 34 for activating an emergency disengagement device and a starter switch 36. The emergency disengagement device is implemented in the software of controller 20 or 28 and causes clutch 6 to be disengaged when switch 34 is operated.

Structure and function of the previously described elements and subassemblies are known and therefore are not explained in detail. The block diagram of FIG. 1 may be altered in various ways; for example, controllers 20 and 28 may be combined into one controller or their function may be distributed to additional controllers. Data required at the time are communicated via BUS 30.

Figure 2:
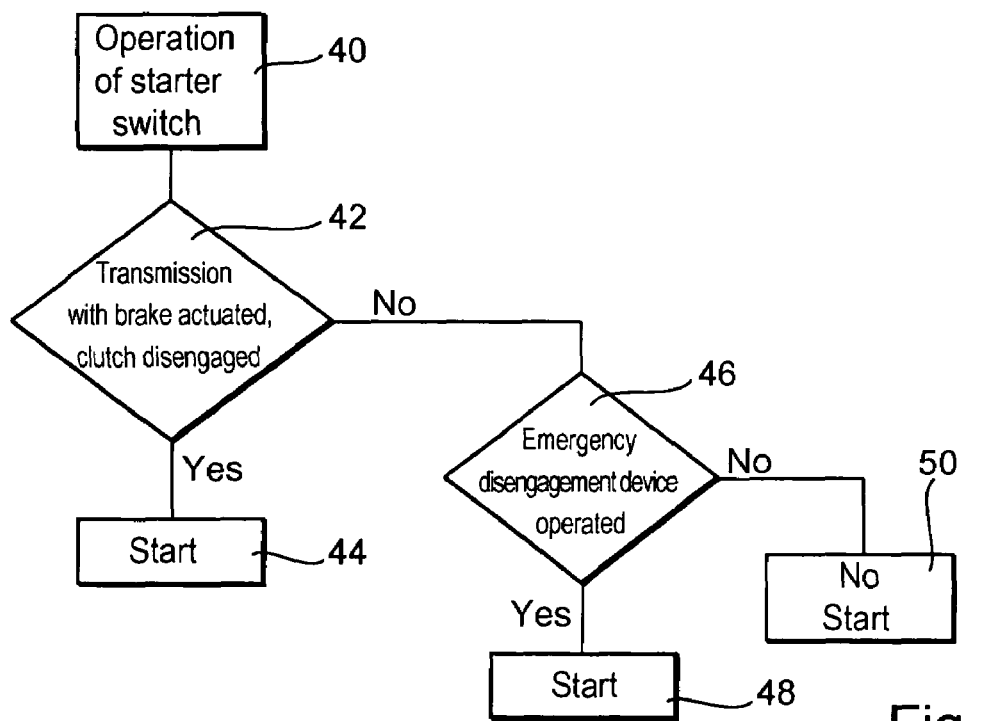
FIG. 2 shows a flow chart for the exemplary explanation of the mode of operation of a system according to the invention.

In order not to set the vehicle in motion unintentionally when starter 32 is operated, different safety measures are implemented that are explained with reference to FIG. 2.

Under this assumption, starter switch 36 is operated in step 40.

In step 42, a check is made of whether predetermined conditions are fulfilled via a particular safety strategy, for example whether transmission 8 is in the neutral position or in zero gear, whether a vehicle brake is operated, for example, the hand brake is pulled or brake pedal 26 is depressed, whether clutch 6 is disengaged (which may be determined, for example, by a position sensor (not shown) contained within actuator device 16, whether selection lever 22 is in the neutral position, etc. The conditions checked in step 42 may be supplemented by additional ones (e.g., engine speed equals zero) or may be present via sub-combinations of the described conditions. If it is determined in step 42 that the safety conditions are satisfied, a starting of internal combustion engine 4 occurs in step 44.

If it is determined in step 42 that the conditions are not fulfilled, according to the invention a check is made in step 46 of whether the emergency disengagement device implemented in one or both of controllers 20 and 28 is activated when switch 34 is operated, which causes clutch 6 to be opened immediately by operation of switch 34 of actuator device 16. If this is the case, then a start occurs in step 48. If this is not the case, then no start of the internal combustion engine occurs despite operation of starter switch 36 (step 50).

According to the invention, a starting of the internal combustion engine is possible when the emergency disengagement device is activated by operating the emergency disengagement device using switch 34.

Of course, the possibility of starting when an emergency disengagement device is operated may be tied to additional conditions, for example, the operation of a vehicle brake. Furthermore, an actuation of the emergency disengagement device does not necessarily have to cause clutch 6 to be disengaged, rather, it can also cause transmission 8 to be shifted into the neutral position. In any event, actuation of the emergency disengagement device using switch 34 causes the torque transmission from internal combustion engine 4 to driven wheels 14 to be interrupted. The invention is used in any event to enable the engine to be started when the emergency disengagement device is activated and in some cases additional conditions, such as vehicle stoppage, engine stoppage, brake operated, etc., are present in order to place the heater or air conditioner of a broken down vehicle in service and supply additional consumers with current without the vehicle being unintentionally set in motion. Errors in the transmission controller or the actuator device for the transmission thus cannot make it so that the engine can no longer be started. Depending on the design of the invention, it is also possible to make it so that errors in the clutch actuation device do not make it so that the internal combustion engine can no longer be started if, for example, it is ensured by the emergency disengagement device that transmission 8 is in a neutral gear.

It is understood that, when the invention is used for twin-clutch or parallel-shift transmissions, both clutches of the transmission are disengaged by the emergency disengagement device (implemented in the software of the controller(s)). Switches 34 and 36 do not necessarily have to be manually operated switches; they may also be operated by speech input or in some other way.

What is claimed is:

1. A system for ensuring the ability to start an internal combustion engine contained within a drive train of a vehicle, this system including, in addition to an actuator device (16, 18) for a torque transmission device (6, 8) contained in the drive train between the internal combustion engine (4) and driven vehicle wheels (14), an enabling device (34) that is operable by a person operating the vehicle and by means of which the operability of the starter (32) is enabled for starting the internal combustion engine when the torque transmission between the internal combustion engine and the driven wheels of the motor vehicle is interrupted, wherein the enabling device contains an emergency disengagement device, which is operable by a person operating the vehicle, to interrupt the torque transmission between the internal combustion engine (4) and the driven wheels (14) of the vehicle, the operability of the starter (32) being enabled when the torque transmission is interrupted by the emergency disengagement device.

2. The system as described in claim 1, the emergency disengagement device being designed in such a manner that clutch (6) disengages.

* * * * *